United States Patent [19]

Hile

[11] Patent Number: 4,920,658
[45] Date of Patent: May 1, 1990

[54] COLLAPSABLE FRAMING SQUARE

[76] Inventor: Jeffrey B. Hile, Rear 95 Benlomond St., Uniontown, Pa. 15401

[21] Appl. No.: 259,827

[22] Filed: Oct. 19, 1988

[51] Int. Cl.⁵ ............................................. B43L 7/06
[52] U.S. Cl. ........................................ 33/499; 33/465
[58] Field of Search ................... 33/465, 466, 467, 468, 33/469, 470, 471, 452, 416, 417, 418, 456, 457, 458, 459, 495, 496, 497, 498, 499, 500

[56] References Cited

U.S. PATENT DOCUMENTS

| | | | |
|---|---|---|---|
| 784,674 | 3/1905 | Haag | 33/418 |
| 840,628 | 1/1907 | Johnson | 33/471 |
| 1,995,658 | 3/1935 | Thompson | 33/416 |
| 2,155,352 | 4/1939 | Yarter | 33/471 |
| 2,316,189 | 4/1943 | Schaefer | 33/418 |
| 2,735,185 | 2/1956 | Naphtal | 33/497 |
| 2,775,037 | 12/1956 | Baumunk | 33/499 |
| 4,223,445 | 9/1980 | Goodland | 33/500 |
| 4,327,501 | 4/1982 | Hurt | 33/465 |
| 4,348,815 | 9/1982 | Hurt | 33/470 |
| 4,562,649 | 1/1986 | Ciavarella | 33/465 |
| 4,720,905 | 1/1988 | Bibeault | 337/407 |
| 4,736,524 | 4/1988 | King | 33/418 |

FOREIGN PATENT DOCUMENTS 556501  4/1958  Canada ................................. 33/471

Primary Examiner—William A. Cuchlinski, Jr.
Assistant Examiner—Diegoff Gutierrez
Attorney, Agent, or Firm—Kirkpatrick & Lockhart

[57] ABSTRACT

A collapsable framing square is comprised of first and second flat rigid arms, a pivot pin permanently attached to one side of the first arm, a pivot plate permanently attached to the second arm defining a hole with a diameter equal to that of the diameter of the pivot pin such that the pivot plate fits over the pivot pin, a spring situated over the pivot pin to engagingly bias the pivot plate against the first arm and a washer and C-clip for securing the spring onto the pivot pin. A washer situated between the spring and the pivot plate includes a projection extending downwardly from the side of the washer facing the pivot plate while the pivot plate includes a plurality of chamfered holes situated about the hole defined by the pivot plate to receive the downward projection.

11 Claims, 2 Drawing Sheets

U.S. Patent  May 1, 1990  Sheet 1 of 2  4,920,658
Fig. 1.
Prior Art
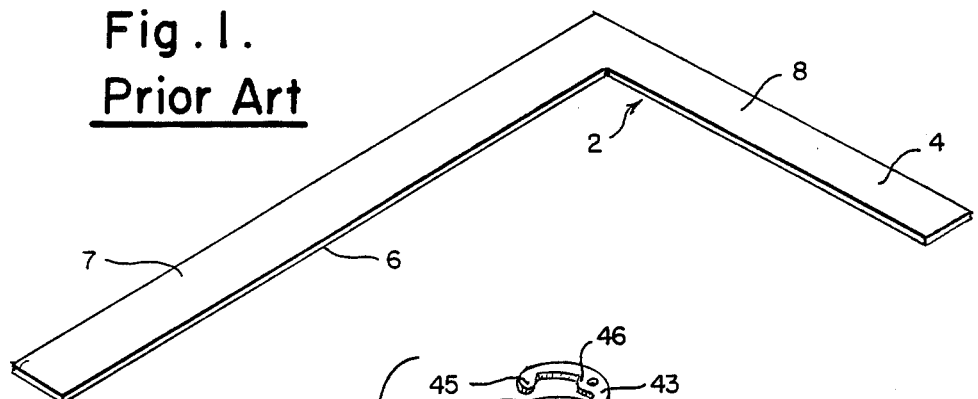
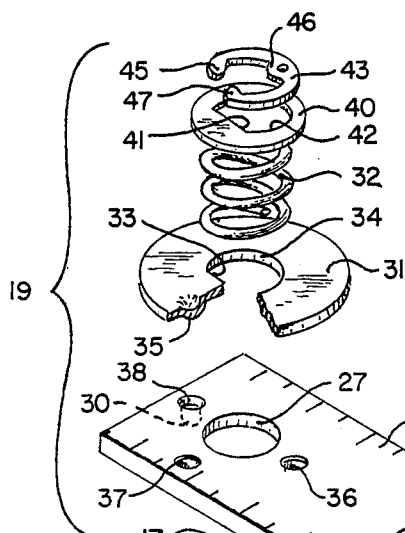
Fig. 7.
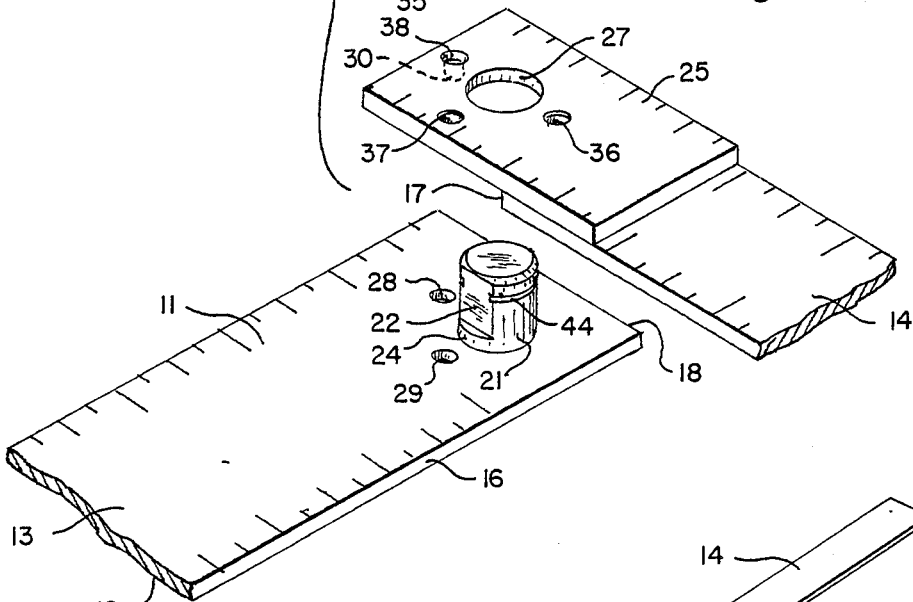
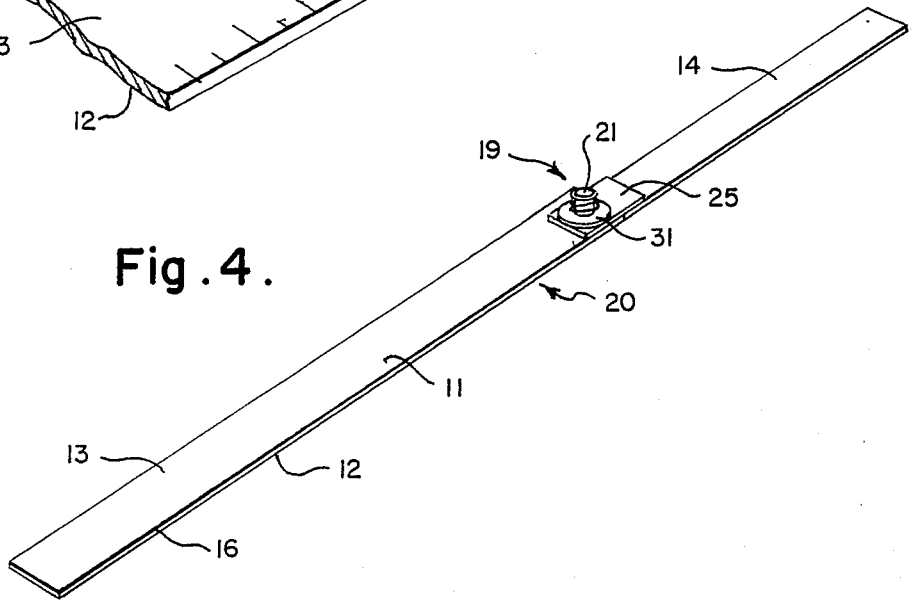
Fig. 4.

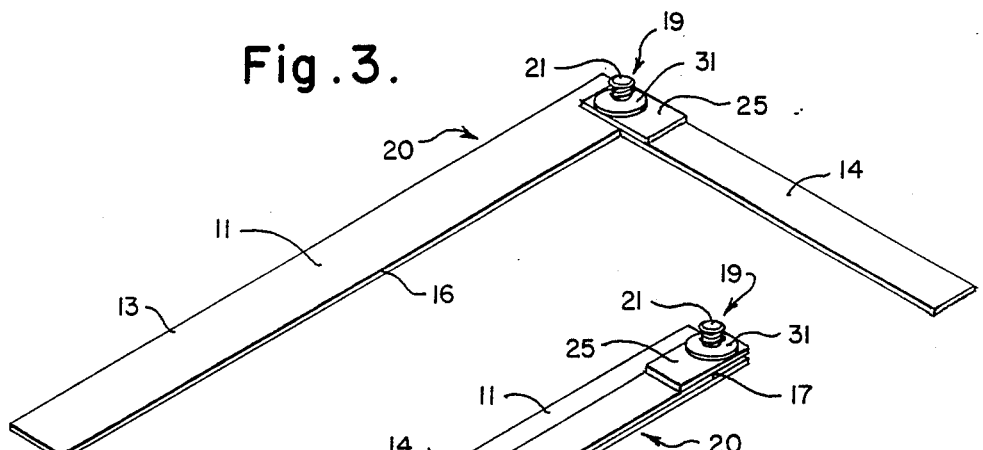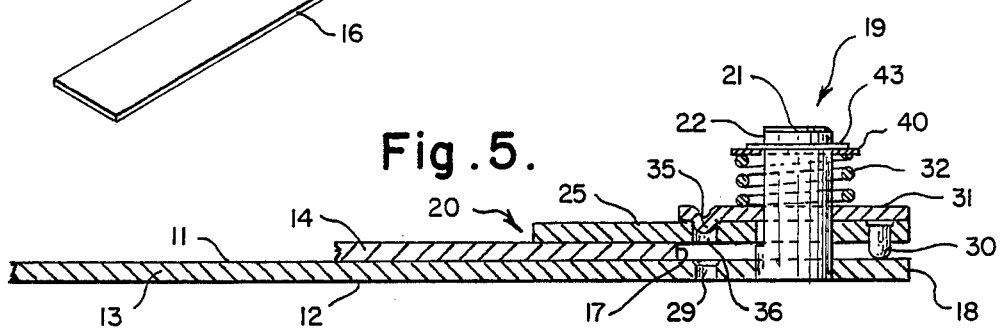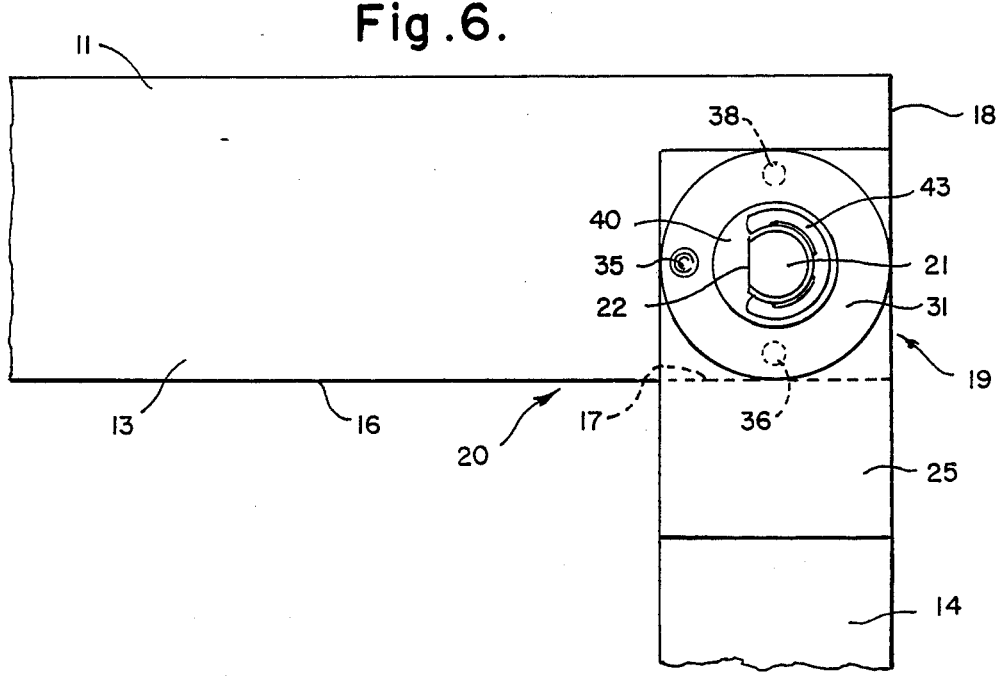

COLLAPSABLE FRAMING SQUARE

BACKGROUND OF THE INVENTION

1. Field of the Invention

The present invention is directed generally to hand tools used in the field of carpentry and, more specifically, to a framing square.

2. Description of the Prior Art

The framing square, also called a rafter square, is especially designed for the carpenter. The framing square is the basic layout tool used in roof framing. A typical prior art framing square 2 is illustrated in FIG. 1. The side 4 with the manufacturer's name is called the face while the opposite side 6 is called the back. The longer arm 7 is 24 inches in length and is called the blade while the shorter arm 8 is 16 inches in length and is called the tongue. The blade 7 forms a precise 90° angle with the tongue 8. Scales, typically in either ⅛ inch or 1/16 inch increments, appear on both the face 4 and the back 6 of the square 2. The back 6 additionally carries a rafter table (not shown) which permits the calculation of the length of a common rafter. The square is generally available in steel, aluminum, or steel with a copper-clad or blued finish. The disadvantage of the prior art framing square 2 is its bulkiness and unwieldiness when transporting it to and from a construction site. The size of the square 2 makes it impossible to transport inside a toolbox unless a slot is cut in the lid of the toolbox to allow square 2 to project through the toolbox lid; otherwise, the square 2 must be carried separately from the other tools used by the carpenter.

Thus, there is a need for a framing square which exhibits all of the functional qualities of the prior art square when in use by the carpenter while also being easily transportable inside a carpenter's toolbox.

SUMMARY OF THE INVENTION

The present invention is directed to a collapsible framing square comprised of first and second flat rigid arms, a pivot pin permanently attached to one side of the first arm, a pivot plate permanently attached to the second arm defining a hole with a diameter equal to that of the diameter of the pivot pin such that the pivot plate fits over the pivot pin, a spring situated over the pivot pin to engagingly bias the pivot plate against the first arm and a washer and C-clip for securing the spring onto the pivot pin. The pivot pin may be machined to a flat edge on the upper portion of one of its radial sides so that a full 360° circumferential edge is maintained at its base. A washer may be situated between the spring and the pivot plate. The washer includes a projection extending downwardly from the side of the washer facing the pivot plate while the pivot plate includes a plurality of chamfered holes situated about the hole defined by the pivot plate to receive the downward projection.

The ability to collapse the framing square of the present invention when it is not in use makes it convenient to transport inside a toolbox along with a carpenter's other tools. The framing square of the present invention also exhibits all of the functional qualities of the prior art framing square when in use by the carpenter.

These and other advantages and benefits of the present invention will become apparent from the description of a preferred embodiment hereinbelow.

BRIEF DESCRIPTION OF THE DRAWINGS

In order that the present invention may be clearly understood and readily practiced, preferred embodiments will now be described, by way of example only, with reference to the accompanying figures wherein:

FIG. 1 illustrates a prior art framing square;

FIG. 2 illustrates the collapsible framing square of the present invention shown in the collapsed position;

FIG. 3 illustrates the collapsible framing square of the present invention shown in the 90° or open position;

FIG. 4 illustrates the collapsible framing square of the present invention shown in the 180° or straight-edge position;

FIG. 5 illustrates a side view of a portion of the collapsible framing square of FIG. 2;

FIG. 6 illustrates a top view of a portion of the collapsible framing square of FIG. 3; and FIG. 7 illustrates the details of the collapsing mechanism of the collapsible framing square of FIG. 3.

DETAILED DESCRIPTION OF THE PREFERRED EMBODIMENT

FIGS. 5 through 7 illustrate the details of a collapsing mechanism 19 of a collapsible framing square 20 of the present invention. Like reference numerals are employed among the various figures to designate like elements. FIG. 7 illustrates a pivot pin 21 which is machined to a flat edge 22 on an upper portion of one of its radial sides and has a full 360° circumferential edge 24 at its base. The circumferential edge 24 of the pivot pin 21 has a height equal to the thickness of a pivot plate 25. The pivot pin 21 may be welded or attached by some other means to a blade 13 of the framing square 20.

A circular hole 27 with a diameter equal to that of the pivot pin 21 is defined by the pivot plate 25 such that pivot plate 25 fits over pivot pin 21. The pivot plate 25 may be welded or attached by some other means to a tongue 14 of the framing square 20. The length and placement of the pivot plate 25 and placement of pivot pin 21 are such that when the square 20 is in the closed position, as illustrated in FIG. 2, the proximal edges of the pivot plate 25 and blade 13 are in alignment; when the square 20 is in the open or 90° position as illustrated in FIG. 3 or the straight-edge or 180° position as illustrated in FIG. 4, edge 17 of tongue 14, shown in FIG. 7, is abuttingly aligned with either edge 16 of blade 13 (90°) or edge 18 of blade 13 (180°), also shown in FIG. 7.

Chamfered holes 28 and 29 are drilled into the blade 13 of the framing square 20 in the positions indicated in FIG. 7. The diameters of these chamfered holes 28 and 29 are larger than the diameter of projection 30 which extends downwardly from pivot plate 25 and is shown in FIG. 5 such that projection 30 may fit easily into either of chamfered holes 28 or 29.

A washer 31 is placed between the pivot plate 25 and a spring 32. The washer 31 has a flat edge 33 on an inner hole 34 to facilitate alignment with the flat surface 22 of the pivot pin 21. The washer 31, because of this design, cannot rotate about the pivot pin 21 but instead remains in a fixed orientation. A projection 35 extends downwardly from a bottom side of the washer 31. Chamfered holes 36, 37 and 38 are located at 90° intervals about the pivot pin hole 27 to receive projection 35. Spring 32 exhibits a spring constant of sufficient magnitude to engagingly bias tongue 14 against blade 13.

Washer 40 has a flat edge 41 on one side of an inner hole 42 and is placed between the spring 32 and a C-clip 43. C-clip 43 fits into a machined groove 44 on the upper portion of pivot pin 21. Pressure is applied at three points 45, 46 and 47 of C-clip 43 to hold the pivot pin 21, pivot plate 25, washer 31, spring 32 and washer 40 in position.

In operation, the framing square 20 is initially in the closed and collapsed position as illustrated in FIG. 2. In this position, projection 30 maintains the blade 13 of the framing square 20 and the tongue 14 in close contact and prevents the distal end of the tongue 14 from rising above the blade 13. Downward projection 35 of washer 31 fits into chamfered hole 36 to secure the tongue 14 into alignment with the blade 13.

The exertion of minimal force on the tongue 14 of the framing square 20 to move it away from the blade 13 within the plane formed by tongue 14 and blade 13 in a counterclockwise direction for an arc of 90° will cause the tongue 14 to lock into place at the 90° position as shown in FIG. 3. The edge 17 of the tongue 14 is abuttingly aligned with the edge 16 of the blade 13. The force exerted by spring 32 locks the two arms 13 and 14 in the 90° and open position. Projection 30 extends through the chamfered hole 28 in the blade 13 so that the blade 13 and tongue 14 form a smooth edge on a back 12 of the framing square 20. Projection 35 extending into chamfered hole 37 provides additional rigidity to the square 20.

The framing square 20 may be either closed into the position of FIG. 2 or opened further into the 180° straight-edge orientation of FIG. 4 from the 90° open position by placing a thumb on pivot pin 21 and exerting an upward force on tongue 14 in order to raise edge 17 of tongue 14 above a face 11 of blade 13. The tongue 14 then may either be rotated clockwise through a 90° arc into the closed position as illustrated in FIG. 2 or may be rotated 90° counterclockwise into the 180° or straight-edge position shown in FIG. 4.

In the straight-edge position shown in FIG. 4, edge 17 of tongue 14 is abuttingly aligned with edge 18 of the blade 13. The force exerted by spring 32 locks the two arms 13 and 14 in the 180° straight-edge position. Projection 30 extends through chamfered hole 29 in the blade 13 so that the blade 13 and tongue 14 form a smooth edge on the back 12 of the framing square 20. Projection 35 extending into chamfered hole 38 provides additional rigidity to the square 20. In a manner similar to that previously described, the framing square 20 may be either positioned in the 90° or open orientation of FIG. 3 or the closed position of FIG. 2 by moving the tongue 14 in a clockwise direction after raising edge 17 of tongue 14 above the face 11 of blade 13.

While the present invention has been described in connection with an exemplary embodiment thereof, it will be understood that many modifications and variations will be readily apparent to those of ordinary skill in the art. This disclosure and the following claims are intended to cover all such modifications and variations.

What is claimed is:

1. A collapsible framing square, comprising:
   a first flat rigid arm;
   a second flat rigid arm;
   a pivot pin permanently attached to one side of said first arm adjacent an end thereof;
   a pivot plate permanently attached to said second arm adjacent and extending beyond an end thereof, said pivot plate defining a hole with a diameter equal to that of the diameter of said pivot pin such that said pivot plate fits over said pivot pin;
   a spring situated over said pivot pin to engagingly bias said pivot plate against said first arm; and
   locking means for securing said spring onto said pivot pin.

2. The collapsible framing square of claim 1 wherein said locking means includes a retaining washer one side of which is disposed adjacent to said spring on a side thereof opposite from said pivot plate and a C-clip disposed adjacent to another side of said retaining washer.

3. The collapsible framing square of claim 2 wherein a groove is machined around the circumference of an upper portion of said pivot pin to receive said C-clip.

4. The collapsible framing square of claim 1 wherein said pivot plate includes a primary downward projection on a side of said pivot plate facing said first arm and said first arm includes a plurality of chamfered holes for receiving said primary downward projection.

5. The collapsible framing square of claim 1 wherein said pivot pin is welded to said first arm and said pivot plate is welded to said second arm.

6. The collapsible framing square of claim 2 wherein said pivot pin is machined to a flat edge on an upper portion of one of its radial sides so that a full 360 circumferential edge is maintained at its base.

7. The collapsible framing square of claim 6 further comprising a positioning washer situated between said spring and said pivot plate.

8. The collapsible framing square of claim 7 wherein said positioning washer includes a secondary downward projection extending from a side of said positioning washer facing said pivot plate and said pivot plate includes a plurality of chamfered holes situated about said hole defined by said pivot plate to receive said secondary downward projection.

9. The collapsible framing square of claim 8 wherein said positioning washer has a flat edge on its inner hole to facilitate alignment with said flat surface of said pivot pin and to prevent rotation of said positioning washer about said pivot pin.

10. The collapsible framing square of claim 1 wherein said second arm comprises an edge which is abuttingly aligned with an edge of said first arm and said spring engagingly biases said edge of said second arm against said edge of said first arm.

11. The collapsible framing square of claim 6 wherein said retaining washer has a flat edge on its inner hole to facilitate alignment with said flat surface of said pivot pin and to prevent rotation of said retaining washer about said pivot pin.

* * * * *